(12) United States Patent
Godley et al.

(10) Patent No.: US 12,333,527 B2
(45) Date of Patent: Jun. 17, 2025

(54) BIFURCATED NON-FUNGIBLE TOKENS AS AN AUTHENTICATOR

(71) Applicant: Bank of America Corporation, Charlotte, NC (US)

(72) Inventors: Jesse James Godley, Charlotte, NC (US); Taylor Farris, Hoboken, NJ (US); Trish Gillis, Chicago, IL (US)

(73) Assignee: Bank of America Corporation, Charlotte, NC (US)

( * ) Notice: Subject to any disclaimer, the term of this patent is extended or adjusted under 35 U.S.C. 154(b) by 223 days.

(21) Appl. No.: 18/222,554

(22) Filed: Jul. 17, 2023

(65) Prior Publication Data

US 2025/0029095 A1 Jan. 23, 2025

(51) Int. Cl.
G06Q 20/36 (2012.01)
G06Q 20/38 (2012.01)
H04L 9/00 (2022.01)

(52) U.S. Cl.
CPC ....... G06Q 20/3674 (2013.01); *G06Q 20/389* (2013.01); *G06Q 2220/00* (2013.01); *H04L 9/50* (2022.05)

(58) Field of Classification Search
None
See application file for complete search history.

(56) References Cited

U.S. PATENT DOCUMENTS 11,159,326 B1 * 10/2021 Nelson .................. G06F 3/0484
2019/0102782 A1 * 4/2019 Diehl ...................... G06F 21/16

(Continued)

FOREIGN PATENT DOCUMENTS

CN 114616582 A * 6/2022 ......... G06F 16/2365
CN 116113967 A * 5/2023 ............. G06F 21/10

(Continued)

OTHER PUBLICATIONS

A. Battah, M. Madine, I. Yaqoob, K. Salah, H. R. Hasan and R. Jayaraman, "Blockchain and NFTs for Trusted Ownership, Trading, and Access of AI Models," in IEEE Access, vol. 10. https://ieeexplore.ieee.org/document/9924181?source=IQplus (Year: 2022).*

(Continued)

*Primary Examiner* — El Mehdi Oussir
(74) *Attorney, Agent, or Firm* — Weiss & Arons LLP

(57) ABSTRACT

Systems for using bifurcated non-fungible tokens for transaction approval are provided. Systems may include a blockchain, a memory and a processor. The processor may, in a pre-approval stage: mint an identity block for each approver included in a plurality of approvers, upload each identity block to the blockchain and assign a non-fungible token to each approver. The processor may, in an approval stage: receive a file for approval; label the file with a file identifier; identify a subset of approvers for file approval; mint an approval block including the file identifier and an entry slot for each non-fungible token associated with each approver included include in the subset; initiate an approval process by the subset of approvers; receive the non-fungible token that identifies the approver; place each received token within an entry slot of the approval block; upload the approval block to a blockchain; validate the approval block and close the approval block.

16 Claims, 8 Drawing Sheets

(56) References Cited

U.S. PATENT DOCUMENTS

2022/0270725 A1* 8/2022 DeRosa-Grund ... G06F 16/2365
2024/0413999 A1* 12/2024 Robell .................. G16H 15/00

FOREIGN PATENT DOCUMENTS

| | | | | | |
|---|---|---|---|---|---|
| GB | 2617083 | A | * 10/2023 | ......... | G06Q 20/0855 |
| JP | 2023066338 | A | * 5/2023 | ........... | H04L 9/3213 |
| WO | WO-2023015312 | A1 | * 2/2023 | ............. | G06F 21/44 |
| WO | WO-2023069689 | A2 | * 4/2023 | ............. | G06F 16/22 |
| WO | WO-2023187312 | A1 | * 10/2023 | ............. | G06F 21/10 |
| WO | WO-2024054665 | A1 | * 3/2024 | | |
| WO | WO-2025019042 | A1 | * 1/2025 | ............... | G06F 8/60 |

OTHER PUBLICATIONS

B. Lashkari and P. Musilek, "A Comprehensive Review of Blockchain Consensus Mechanisms," in IEEE Access, vol. 9, pp. 43620-43652, 2021. https://ieeexplore.ieee.org/document/9376868?source=IQplus (Year: 2021).*

Anastasiia Lastovetska, "Blockchain Architecture Basics: Components, Structure, Benefits & Creation," MLSDev, Nov. 12, 2021.

Steve Kaczynski and Scott Duke Kominers, "How NFT's Create Value," Harvard Business Review, Nov. 10, 2021.

* cited by examiner

BIFURCATED NON-FUNGIBLE TOKENS AS AN AUTHENTICATOR

FIELD OF TECHNOLOGY

Aspects of the disclosure relate to non-fungible tokens.

BACKGROUND OF THE DISCLOSURE

Recently, there has been an increase in the usage of non-fungible tokens. A non-fungible token is a unique identifier that is recorded (or tokenized) using distributed ledger technology, such as blockchain technology. The distributed ledger or blockchain technology may assign each non-fungible token unique identification codes and metadata. The unique identification codes and metadata uniquely identifies each non-fungible token and distinguishes each non-fungible token from any other non-fungible token on the blockchain.

Distributed ledger technology, such as blockchain technology, uses independent digital systems, within a network, to record, share and/or synchronize transactions. The details of the transactions may be recorded simultaneously on multiple nodes within the network. By recording the transactions on multiple nodes, the ownership of the digital asset is confirmed by members of the network.

Non-fungible tokens may be used to certify authenticity and ownership of an associated right or asset. As such, a non-fungible token may be understood to be a digital token that functions as a certificate of ownership for an asset. The asset may be a digital asset. Examples of digital assets may be a piece of digital art, an identity card, a video file, an audio file or any other suitable digital asset. The certificate of ownership, or non-fungible token, is registered and stored on the distributed ledger/blockchain. Because the certificate of ownership, or non-fungible token, is stored on the distributed ledger/blockchain, the ownership of the digital asset is confirmed by the members of the network.

It should be noted that the definition of fungible may be exchangeable or interchangeable. As such, a fungible token may be a token that can be exchanged or interchanged with another token. The non-fungible tokens may not be exchangeable because each non-fungible token is assigned a unique identification code and metadata to distinguish each non-fungible token from other non-fungible tokens. The non-fungible tokens may also not be exchangeable at least because the non-fungible tokens may certify ownership of different digital assets and therefore, may be associated with different value amounts.

It would be desirable to harness the capabilities of non-fungible tokens to verify and approve digital files. It would be further desirable to combine multiple non-fungible tokens to create a unique combination identifier for each approved digital file.

SUMMARY OF THE DISCLOSURE

Apparatus, methods and systems for using bifurcated non-fungible tokens to provide approval is provided. At times, entities may require approvals for various files, such as production files, payment files, source code files and any other suitable files. Some files may be files of different importance. As such, before files are pushed from a development environment to a production environment, or before files are pushed from a draft stage to a completion stage, files may be approved. Certain files may require simple approvals, such as an approval from a single low-level approver, while certain approvals may require complex approvals, such as an approval from each of multiple high-level approvers or other relevant parties.

Apparatus, systems and methods may harness the authenticity and ownership certification provided by non-fungible tokens for approvals. As such, heightened digital approval security is provided by the enhanced capabilities of non-fungible tokens.

BRIEF DESCRIPTION OF THE DRAWINGS

The objects and advantages of the invention will be apparent upon consideration of the following detailed description, taken in conjunction with the accompanying drawings, in which like reference characters refer to like parts throughout, and in which.

DETAILED DESCRIPTION OF THE DISCLOSURE

Figure 1:
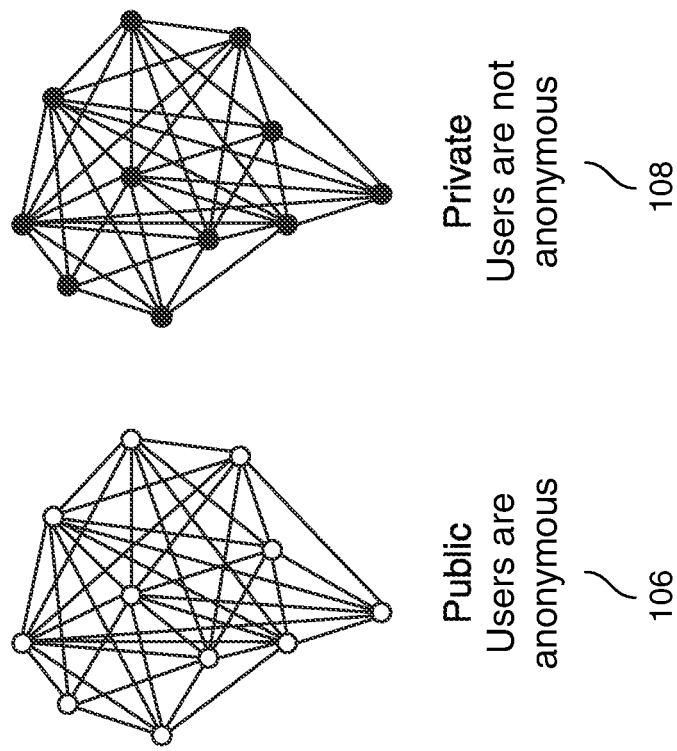
FIG. 1 shows an illustrative diagram in accordance with principles of the disclosure.
Figure 1:
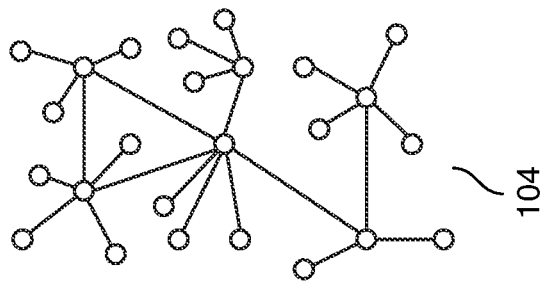
Figure 1:
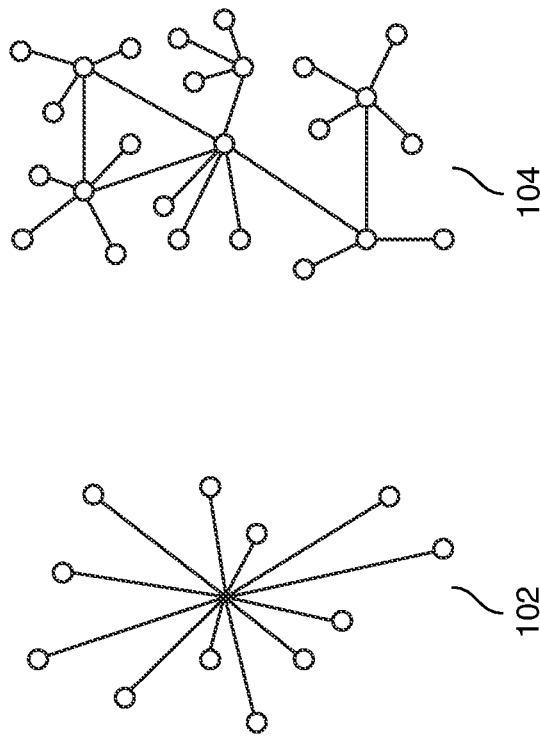

Apparatus, methods and systems for using bifurcated non-fungible tokens to provide transactions approval is provided. Apparatus, methods and systems may include a hardware memory and/or a hardware processor.

A transaction approval may require approval by a plurality of approvers. Methods may include creating a non-fungible token for each approver included in the plurality of approvers. Creation of the non-fungible token may include the following steps: minting an identity block for each approver, uploading the identity block to a blockchain and assigning a non-fungible token that uniquely identifies the approver. The blockchain may be stored on a hardware memory. The non-fungible token may be assigned in response to the uploading. Minting the identity block may include creating a new block that corresponds to the identity block on the blockchain, validating the new block by a validator of the blockchain and closing the new block.

The validator of the blockchain may be a member of a network associated with the blockchain. The validator of the blockchain may validate the new block using a proof of work validation process and/or a proof of stake validation process. A proof of work validation process may involve competition of various members to determine an unidentified numerical value. A proof of stake validation process may involve a single assigned member determining the unidentified numerical value. The new block may be closed upon confirmation, by the blockchain network, of the unidentified numerical value.

The creation of the identity block may involve the processes of creation of a block on a blockchain. As such, the creation of the identity block may involve initiating, receiving and validating transactions by a network associated with the blockchain.

The non-fungible token may uniquely identify the approver. The non-fungible token may be identified by the unique identification code and metadata assigned by the blockchain network to the non-fungible token.

Methods may include receiving a file for approval by a transaction approval processor. Methods may include labeling the file with a unique file identifier. Methods may include identifying a subset of approvers for approval. The subset of approvers may be included in the plurality of approvers. The subset of approvers may be identified for each file. As such, for each file, there may be a different subset of approvers.

Methods may include minting an approval block. The approval block may include one or more entry slots. Each of the one or more entry slots may be designed to accept or receive one of the non-fungible tokens associated with an approver included in each of the subset of approvers. The approval block may also include the unique file identifier. At times, the approval block may be referred to as a non-fungible token.

Methods may include initiating an approval process by the subset of approvers. The approval process may include transmitting the file to each of the approvers. The transmission of the file may be via electronic transmission, such as e-mail, chat, website post or any other suitable electronic transmission. In the event that the approver approves the file, the approver may place its non-fungible token in the entry slot within the approval block.

At times, the approver may select an approval button on a webpage, which may initiate the process of placing the non-fungible token in the entry slot within the approval block. As such, in such embodiments, the approver may be unaware of the non-fungible token and the underlying process.

It should be noted that placing the non-fungible token within the entry slot may indicate approval on behalf of the approver. Additionally, because the non-fungible token of the approver is unique to the approver, it may be difficult to maliciously replicate the non-fungible token and impersonate the approver. Therefore, using a non-fungible token to approve a transaction may ensure that the received approvals are legitimate. Once the non-fungible tokens are received from all of the approvers indicated in the subset of approvers, the approval block may be uploaded to a blockchain. The blockchain may be the same blockchain which stores the approver identity non-fungible tokens. The blockchain may be a different blockchain from the blockchain that stores the approver identity non-fungible tokens. As such, the network associated with the approver identity blockchain may or may not be the same network as the network associated with the approval blockchain.

Methods may include validating the approval block. The approval block may be validated by members of the approval blockchain. Methods may include closing the approval block. Once the approval block is closed, the file may be transferred from a first environment to a second environment. For example, the file may be transferred from a development environment, or draft environment, to a production or completion environment. The blockchain may concretize the transaction by indicating the transfer of ownership of the approval block to a second entity.

In some embodiments, the approval block may indicate that a payment should be transferred from a first entity to a second entity.

Apparatus and methods described herein are illustrative. Apparatus and methods in accordance with this disclosure will now be described in connection with the figures, which form a part hereof. The figures show illustrative features of apparatus and method steps in accordance with the principles of this disclosure. It is to be understood that other embodiments may be utilized and that structural, functional and procedural modifications may be made without departing from the scope and spirit of the present disclosure.

The steps of methods may be performed in an order other than the order shown or described herein. Embodiments may omit steps shown or described in connection with illustrative methods. Embodiments may include steps that are neither shown nor described in connection with illustrative methods.

Illustrative method steps may be combined. For example, an illustrative method may include steps shown in connection with another illustrative method.

Apparatus may omit features shown or described in connection with illustrative apparatus. Embodiments may include features that are neither shown nor described in connection with the illustrative apparatus. Features of illustrative apparatus may be combined. For example, an illustrative embodiment may include features shown in connection with another illustrative embodiment.

FIG. 1 shows an illustrative diagram. The illustrative diagram shows various diagrams to explain a blockchain architecture.

A centralized architecture may be shown at 102. Each node of the centralized architecture may be connected to a centralized point.

A decentralized architecture may be shown at 104. Each node of the decentralized architecture may be connected to at least one other node within the network. However, none of the nodes may be identified as a centralized node.

Distributed ledgers may be shown at 106 and 108. A blockchain may also be identified as using distributed ledger technology.

A distributed ledger architecture may include multiple interconnected nodes. Many times, each node, within a distributed ledger, may be connected to each other node, within the distributed ledger. Data posted to a first node may be broadcasted to all of the other nodes within the distributed ledger network.

A public distributed ledger may be shown at 106. Users within a public distributed ledger may be anonymous.

A private distributed ledger may be shown at 108. Users within a private distributed ledger may not be anonymous. As such, the identities of the users within the private distributed ledger may be known to the other users (or node operators).

Figure 2:
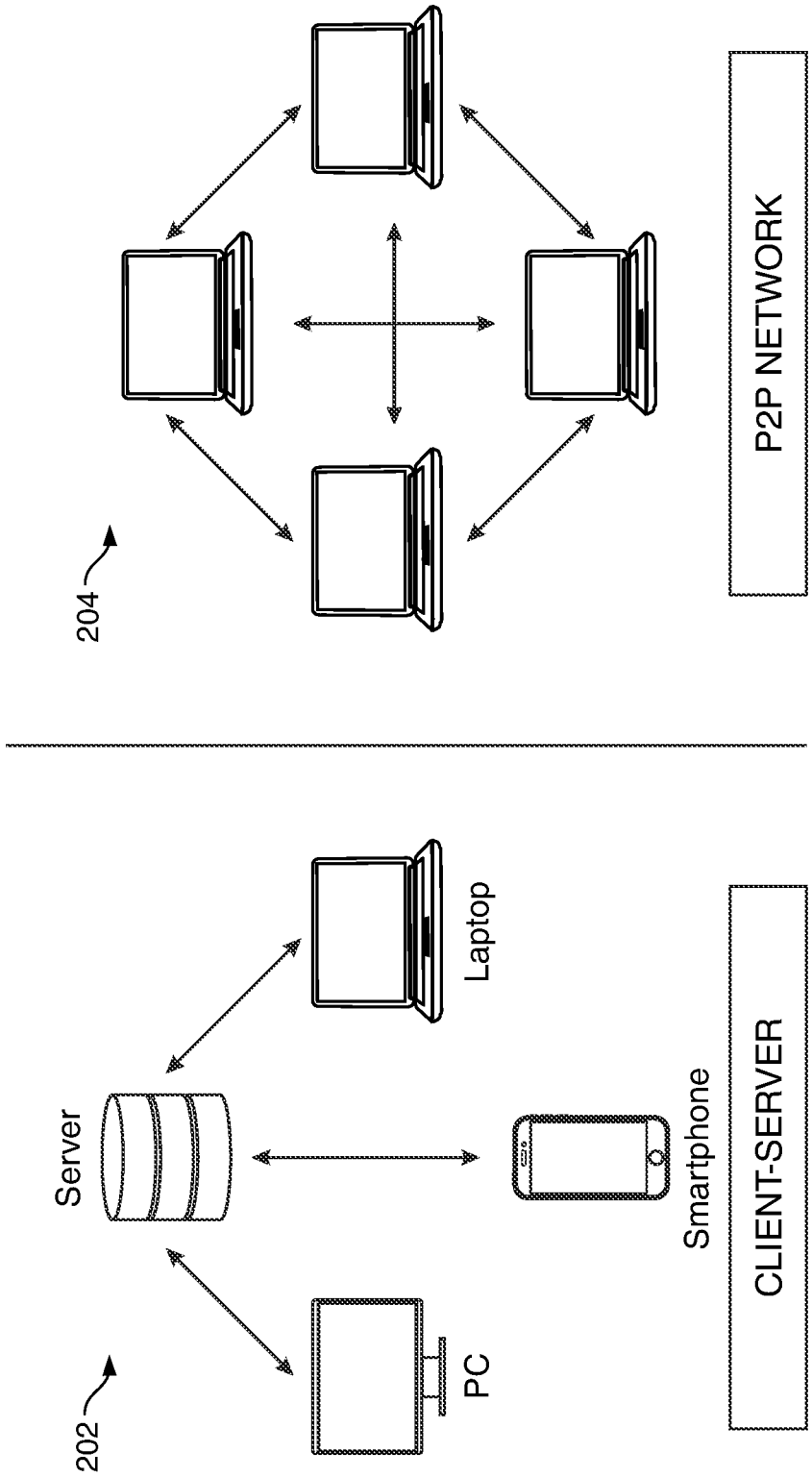
FIG. 2 shows another illustrative diagram in accordance with principles of the disclosure.

FIG. 2 shows an illustrative diagram. The illustrative diagram shows a comparison between database architecture and blockchain architecture. A client-server (database architecture) may be shown at 202. A P2P (person to person) network (blockchain architecture) may be shown at 204.

As shown in FIG. 2, a database architecture may involve various nodes, such as a personal computer ("PC"), laptop and smartphone. Each of the various nodes may connect, or communicate with, a single server (also referred to as centralized node or database). However, a distributed ledger (blockchain technology) may operate with multiple nodes communicating with all other nodes within the network.

Figure 3:
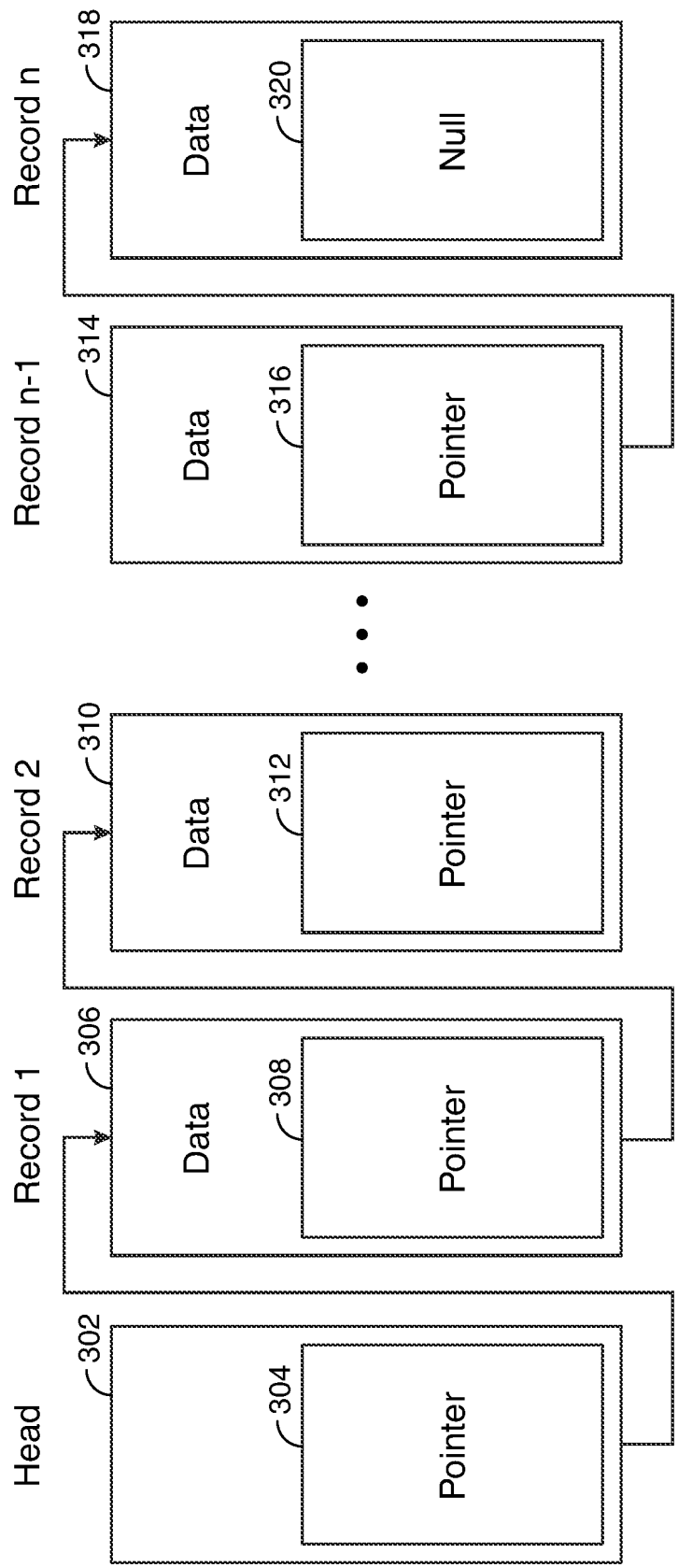
FIG. 3 shows still another illustrative diagram in accordance with principles of the disclosure.

FIG. 3 shows an illustrative diagram. The illustrative diagram shows blockchain hashing. A blockchain may include a plurality of blocks, such as block 302, block 306, block 310, block 314 and block 318. Each of the blocks may be connected to another block by a pointer. Each pointer, included in each block may point to the next block on the blockchain. As such, pointer 304, included in block 302 may point to block 306 (also referred to as record 1). Pointer 308, included in block 306, may point to block 310 (also referred to as record 2). Pointer 312, included in block 310, may point to an additional block (not shown). Pointer 316, included in block 314 (also referred to as record n−1), may point to block 318 (also referred to as record n). Pointer 320, included in block 318 may be a null pointer at least because at the point in time shown in FIG. 3, does not point to another block or record.

The first block within a blockchain may be referred as the head block (as shown at 302). The head block may not include data. However, each subsequent block within the blockchain may include data, such as data referring to a non-fungible token.

Figure 4:
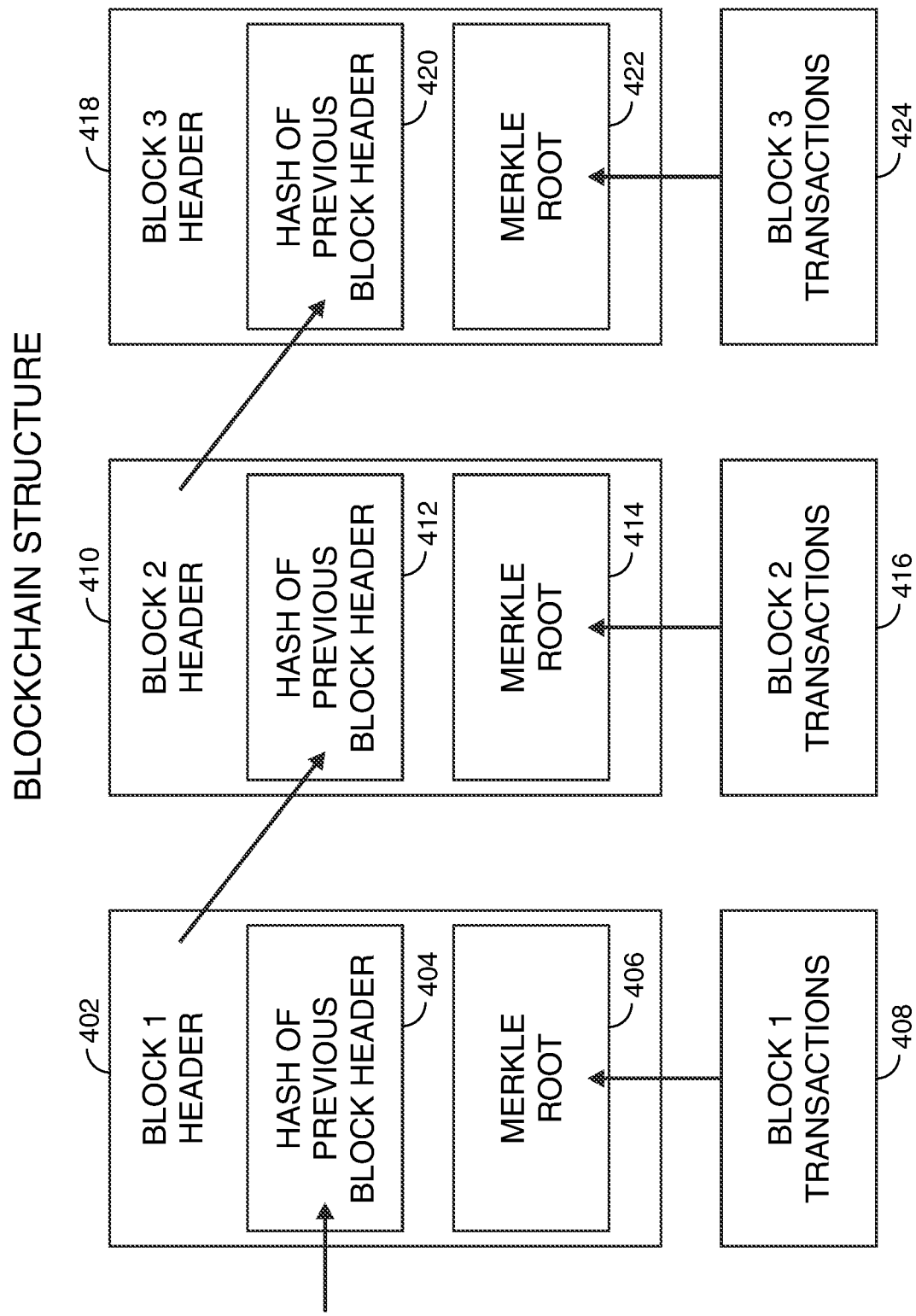
FIG. 4 shows yet another illustrative diagram in accordance with principles of the disclosure.

FIG. 4 shows an illustrative diagram. The illustrative diagram shows an illustrative blockchain structure. The blockchain structure shows block 1, shown at 402, block 2, shown at 410 and block 3, shown at 418. Each of the blocks may include a header (which includes metadata), a hash of the previous block header and a Merkle root. The transactions certified by the blockchain may be included in the Merkle root. A Merkle root may be defined as the hash of all the hashes of all the transactions that are part of a block in a blockchain network.

Block 1, shown at 402, may include a header, hash of previous block header 404 and Merkle root 406. Merkle root 406 may include a hash of a set of transactions 408 that are concretized by block 1 in addition to any other previous transactions (not shown).

Block 2, shown at 410, may include a header, hash of previous block header 412 and Merkle root 414. Merkle root 414 may include a hash of a set of transactions 416 that are concretized by block 2 in addition to any other previous transactions (such as block 1).

Block 3, shown at 418, may include a header, hash of previous block header 420 and Merkle root 422. Merkle root 422 may include a hash of a set of transactions 424 that are concretized by block 3 in addition to any other previous transactions (blocks 1 and 2).

Figure 5:
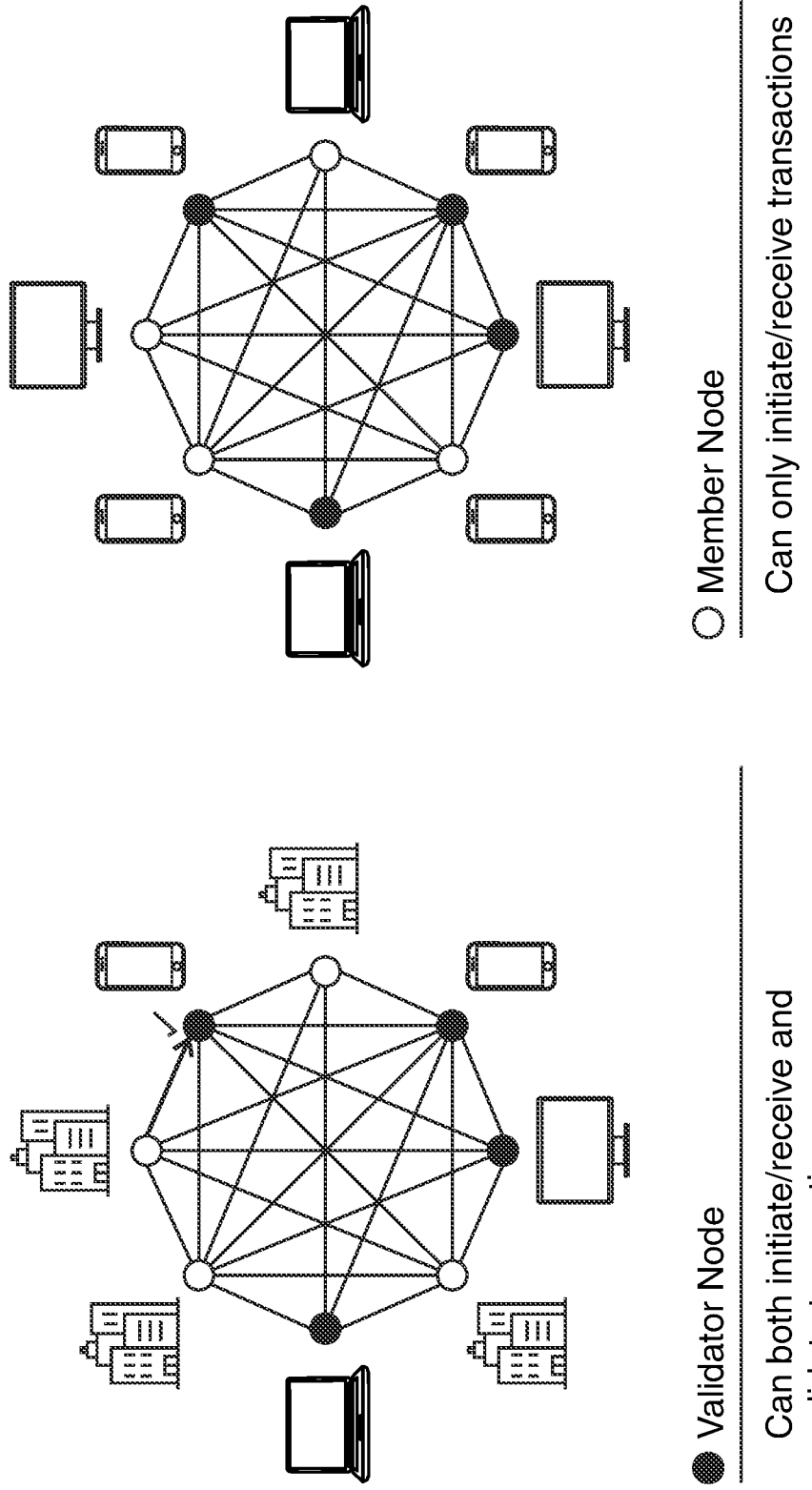
FIG. 5 shows still yet another illustrative diagram in accordance with principles of the disclosure.

FIG. 5 shows an illustrative diagram. The illustrative diagram shows types of blockchain architectures. The illustrative diagram shows several types of nodes. A validator node, shown with a darkened circle, may be operable to initiate, receive and validate transactions. A member node, shown with an empty circle, may be operable to initiate and receive transactions. Member nodes may not be able to validate transactions.

Figure 6:
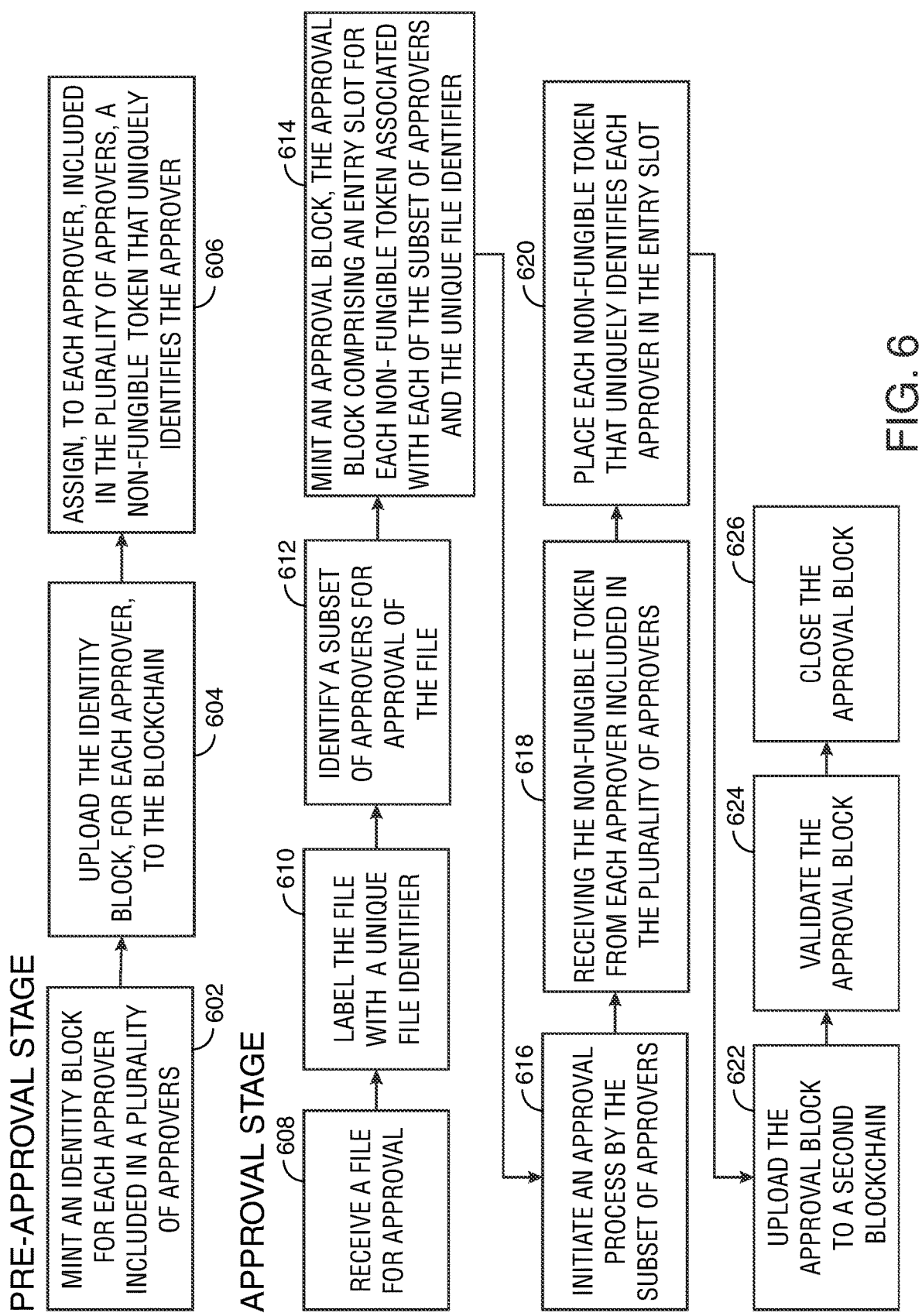
FIG. 6 shows an illustrative flow chart in accordance with principles of the disclosure.

FIG. 6 shows an illustrative flow chart. The illustrative flow chart includes a pre-approval stage and an approval stage.

The pre-approval stage may include the following steps: Step 602 may include minting an identity block for each approver included in a plurality of approvers. Step 604 may include uploading the identity block, for each approver, to the blockchain. Step 606 shows assigning, to each approver, included in the plurality of approvers, a non-fungible token that uniquely identifies the approver.

The approval stage may include the following steps: Step 608 may include receiving a file for approval. Step 610 may include labeling the file with a unique file identifier. Step 612 may include identifying a subset of approvers for approval of the file. Step 614 may include minting an approval block. The approval block may include an entry slot for each non-fungible token associated with the subset of approvers.

The approval block may also include the unique file identifier. Step 616 may include initiating an approval process by the subset of approvers. Step 618 may include receiving the non-fungible token from each approver included in the plurality of approvers. Step 620 may include placing each non-fungible token in the appropriate entry slot. Step 622 may include uploading the approval block to a second blockchain. Step 624 may include validating the approval block. Step 626 may include closing the approval block.

Figure 7:
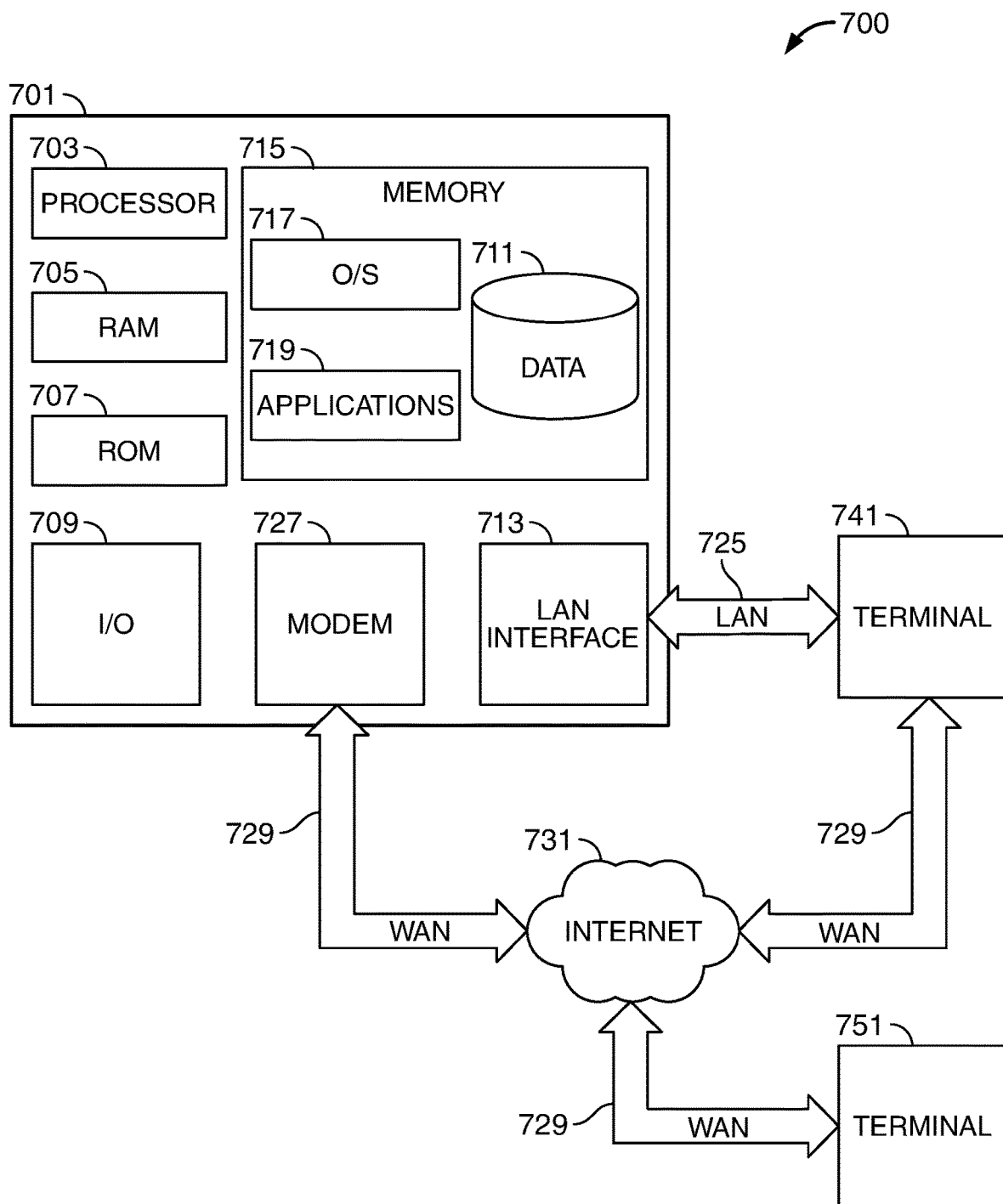
FIG. 7 shows another illustrative diagram in accordance with principles of the disclosure.

FIG. 7 shows an illustrative block diagram of system 700 that includes computer 701. Computer 701 may alternatively be referred to herein as a "server" or a "computing device." Computer 701 may be a workstation, desktop, laptop, tablet, smart phone, or any other suitable computing device. Elements of system 700, including computer 701, may be used to implement various aspects of the systems and methods disclosed herein.

Computer 701 may have a processor 703 for controlling the operation of the device and its associated components, and may include RAM 705, ROM 707, input/output module 709, and a memory 715. The processor 703 may also execute all software running on the computer—e.g., the operating system and/or voice recognition software. Other components commonly used for computers, such as EEPROM or Flash memory or any other suitable components, may also be part of the computer 701.

The memory 715 may comprise any suitable permanent storage technology—e.g., a hard drive. The memory 715 may store software including the operating system 717 and application(s) 719 along with any data/database 711 needed for the operation of the system 700. Memory 715 may also store videos, text, and/or audio assistance files. The videos, text, and/or audio assistance files may also be stored in cache memory, or any other suitable memory. Alternatively, some or all of computer executable instructions (alternatively referred to as "code") may be embodied in hardware or firmware (not shown). The computer 701 may execute the instructions embodied by the software to perform various functions.

Input/output ("I/O") module may include connectivity to a microphone, keyboard, touch screen, mouse, and/or stylus through which a user of computer 701 may provide input. The input may include input relating to cursor movement. The input may relate to transaction pattern tracking and prediction. The input/output module may also include one or more speakers for providing audio output and a video display device for providing textual, audio, audiovisual, and/or graphical output. The input and output may be related to computer application functionality. The input and output may be related to transaction pattern tracking and prediction.

System 700 may be connected to other systems via a local area network (LAN) interface or adapter 713.

System 700 may operate in a networked environment supporting connections to one or more remote computers, such as terminals 741 and 751. Terminals 741 and 751 may be personal computers or servers that include many or all of the elements described above relative to system 700. The network connections depicted in FIG. 7 include a local area network (LAN) 725 and a wide area network (WAN) 729, but may also include other networks. When used in a LAN networking environment, computer 701 is connected to LAN 725 through a LAN interface or adapter 713. When used in a WAN networking environment, computer 701 may include a modem 727 or other means for establishing communications over WAN 729, such as Internet 731.

It will be appreciated that the network connections shown are illustrative and other means of establishing a communications link between computers may be used. The existence of various well-known protocols such as TCP/IP, Ethernet, FTP, HTTP and the like is presumed, and the system can be operated in a client-server configuration to permit a user to retrieve web pages from a web-based server. The web-based server may transmit data to any other suitable computer system. The web-based server may also send computer-readable instructions, together with the data, to any suitable computer system. The computer-readable instructions may be to store the data in cache memory, the hard drive, secondary memory, or any other suitable memory.

Additionally, application program(s) 719, which may be used by computer 701, may include computer executable instructions for invoking user functionality related to communication, such as e-mail, Short Message Service (SMS), and voice input and speech recognition applications. Application program(s) 719 (which may be alternatively referred to herein as "plugins," "applications," or "apps") may include computer executable instructions for invoking user functionality related to performing various tasks. The various tasks may be related to transaction pattern tracking and prediction.

Computer 701 and/or terminals 741 and 751 may also be devices including various other components, such as a battery, speaker, and/or antennas (not shown).

Terminal 751 and/or terminal 741 may be portable devices such as a laptop, cell phone, Blackberry™, tablet, smartphone, or any other suitable device for receiving, storing, transmitting and/or displaying relevant information. Terminals 751 and/or terminal 741 may be other devices. These devices may be identical to system 700 or different. The differences may be related to hardware components and/or software components.

Any information described above in connection with data/database 711, and any other suitable information, may be stored in memory 715. One or more of applications 719 may include one or more algorithms that may be used to implement features of the disclosure, and/or any other suitable tasks.

The invention may be operational with numerous other general purpose or special purpose computing system environments or configurations. Examples of well-known computing systems, environments, and/or configurations that may be suitable for use with the invention include, but are not limited to, personal computers, server computers, hand-held or laptop devices, tablets, mobile phones, smart phones and/or other personal digital assistants ("PDAs"), multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, etc., that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices.

Figure 8:
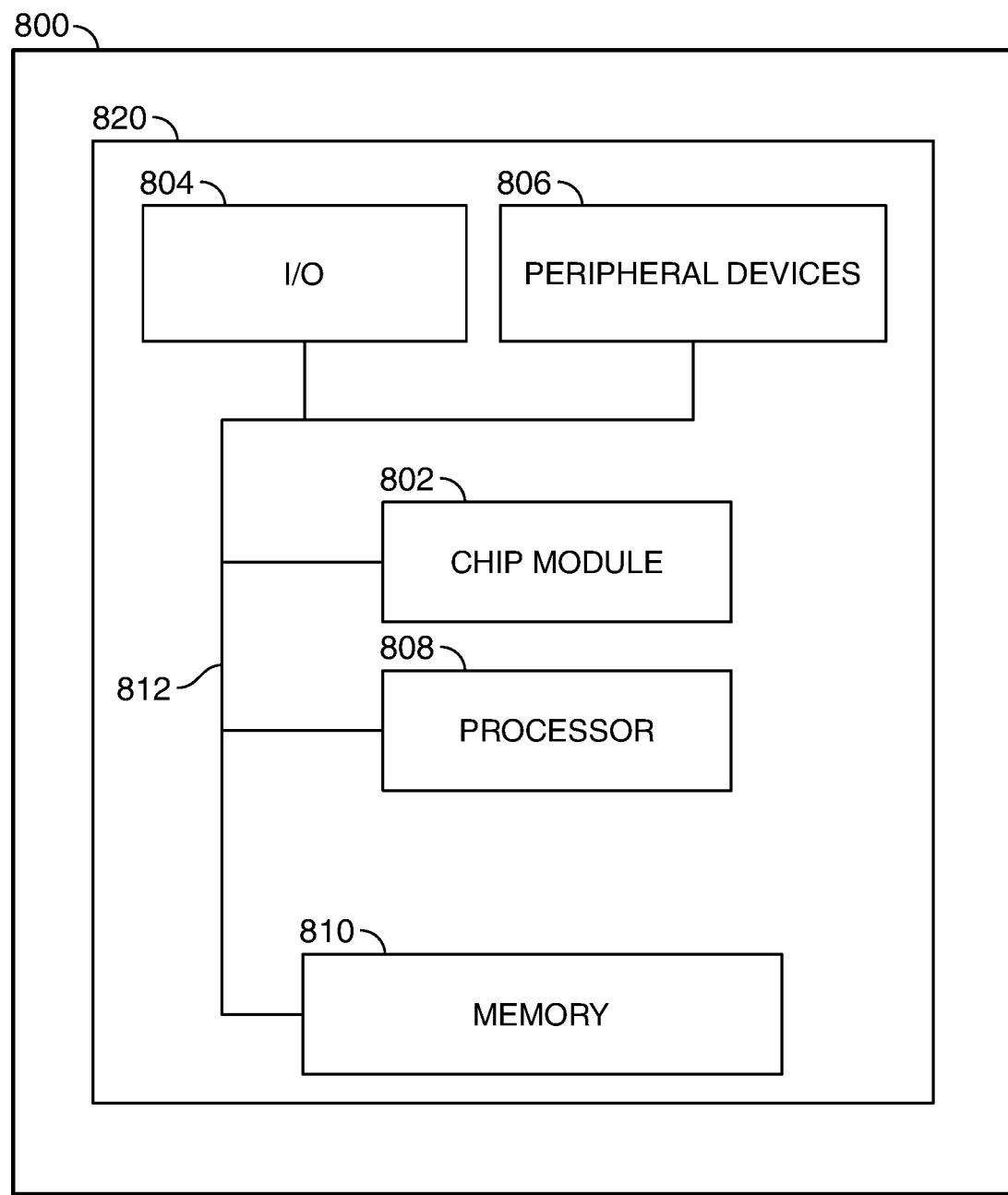
FIG. 8 shows yet another illustrative diagram in accordance with principles of the disclosure.

FIG. 8 shows illustrative apparatus 800 that may be configured in accordance with the principles of the disclosure. Apparatus 800 may be a computing machine. Apparatus 800 may include one or more features of the apparatus shown in FIG. 7. Apparatus 800 may include chip module 802, which may include one or more integrated circuits, and which may include logic configured to perform any other suitable logical operations.

Apparatus 800 may include one or more of the following components: I/O circuitry 804, which may include a transmitter device and a receiver device and may interface with fiber optic cable, coaxial cable, telephone lines, wireless devices, PHY layer hardware, a keypad/display control device or any other suitable media or devices; peripheral devices 806, which may include counter timers, real-time timers, power-on reset generators or any other suitable peripheral devices; logical processing device 808, which may compute data structural information and structural parameters of the data; and machine-readable memory 810.

Machine-readable memory 810 may be configured to store in machine-readable data structures: machine executable instructions (which may be alternatively referred to herein as "computer instructions" or "computer code"), applications, signals, and/or any other suitable information or data structures.

Components 802, 804, 806, 808 and 810 may be coupled together by a system bus or other interconnections 812 and may be present on one or more circuit boards such as 820. In some embodiments, the components may be integrated into a single chip. The chip may be silicon-based.

Thus, systems and methods for bifurcated non-fungible tokens as an authenticator are provided. Persons skilled in the art will appreciate that the present invention can be practiced by other than the described embodiments, which are presented for purposes of illustration rather than of limitation. The present invention is limited only by the claims that follow.

What is claimed is:

1. A method for using bifurcated non-fungible tokens to provide transaction approval for a transaction comprising a transfer of ownership, the method comprising:
   minting an identity block for each approver among a plurality of approvers;
   uploading the identity block to a blockchain for each approver among the plurality of approvers;
   assigning, in response to the uploading, a non-fungible token that uniquely identifies each approver among the plurality of approvers;
   receiving, from a first entity, a file for approval;
   labeling the file with a unique file identifier;
   identifying a subset of approvers from among the plurality of approvers for approval of the transaction that correlates to the file;
   minting an approval block for the transaction, the approval block comprising:
      an entry slot for each non-fungible token associated with each of the subset of approvers among the plurality of approvers; and
      the unique file identifier;
   initiating an approval process by the subset of approvers among the plurality of approvers;
   receiving, from each approver among the plurality of approvers, the non-fungible token that uniquely identifies each approver among the plurality of approvers;
   placing each non-fungible token that uniquely identifies each approver among the plurality of approvers in the entry slot;
   in response to receipt of the non-fungible token from all of the approvers in the subset of approvers, uploading the approval block to a second blockchain;

validating the approval block; and
closing the approval block, wherein closing the approval block comprises concretizing the transaction by indicating the transfer of ownership of the approval block to a second entity.

2. The method of claim 1 wherein the minting the identity block comprises:
   creating a new block that corresponds to the identity block on the blockchain;
   validating the new block by a validator of the blockchain; and
   closing the new block.

3. The method of claim 2 wherein the validating the new block comprises receiving proof of work by a plurality of users of the blockchain.

4. The method of claim 2 wherein the validating the new block comprises receiving proof of stake by a validator of the blockchain.

5. A system for using bifurcated non-fungible tokens to provide transaction approval for a transaction comprising a transfer of ownership, the system comprising:
   a blockchain stored on a hardware memory;
   a hardware processor, the hardware processor operable to:
      in a pre-approval stage:
         mint an identity block for each approver among a plurality of approvers;
         upload the identity block to the blockchain for each approver among the plurality of approvers;
         assign a non-fungible token that uniquely identifies each approver among the plurality of approvers;
      in an approval stage:
         receive, from a first entity, a file for approval;
         label the file with a unique file identifier;
         identify a subset of approvers from among the plurality of approvers for approval of the transaction that correlates to the file, the subset of approvers selected from the plurality of approvers;
         mint an approval block for the transaction, the approval block comprising:
            an entry slot for each non-fungible token associated with each of the subset of approvers among the plurality of approvers; and
            the unique file identifier;
         initiate an approval process by the subset of approvers among the plurality of approvers;
         receive, from each approver among the plurality of approvers, the non-fungible token that uniquely identifies each approver among the plurality of approvers;
         place each non-fungible token that uniquely identifies each approver among the plurality of approvers in the entry slot;
         upload the approval block to a second blockchain;
         validate the approval block; and
         close the approval block, said close the approval block comprises concretization of the transaction by indicating the transfer of ownership of the approval block to a second entity.

6. The system of claim 5 wherein mint the identity block comprises:
   create a new block that corresponds to the identity block on the blockchain;
   validate the new block by a validator of the blockchain; and
   close the new block.

7. The system of claim 6 wherein the validation is a proof of work validation executed by a plurality of users of the blockchain.

8. The system of claim 6 wherein the validation is a proof of stake of validation executed by a plurality of users of the blockchain.

9. A method for using bifurcated non-fungible tokens to provide approval for a transaction comprising a transfer of ownership, the method comprising:
   minting an identity block for each approver among a plurality of approvers;
   uploading the identity block to a blockchain for each approver among the plurality of approvers;
   assigning, in response to the uploading, a non-fungible token that uniquely identifies each approver among the plurality of approvers;
   receiving, from a first entity, a file for approval;
   labeling the file with a unique file identifier;
   identifying a subset of approvers from among the plurality of approvers for approval of the transaction that corresponds to the file;
   minting an approval block, the approval block comprising:
      an entry slot for each non-fungible token associated with each of the subset of approvers among the plurality of approvers; and
      the unique file identifier;
   initiating an approval process by the subset of approvers among the plurality of approvers;
   receiving, from each approver among the plurality of approvers, the non-fungible token that uniquely identifies each approver among the plurality of approvers;
   placing each non-fungible token that uniquely identifies each approver among the plurality of approvers in the entry slot;
   in response to receipt of the non-fungible token from all of the approvers in the subset of approvers, uploading the approval block to the a second blockchain;
   validating the approval block; and
   closing the approval block, wherein closing the approval block comprises concretizing the transaction by indicating the transfer of ownership of the approval block to a second entity.

10. The method of claim 9 wherein the minting the identity block comprises:
    creating a new block that corresponds to the identity block on the blockchain;
    validating the new block by a validator of the blockchain; and
    closing the new block.

11. The method of claim 10 wherein the validating the new block comprises receiving proof of work by a plurality of users of the blockchain.

12. The method of claim 10 wherein the validating the new block comprises receiving proof of stake by a validator of the blockchain.

13. A system for using bifurcated non-fungible tokens to provide approval for a transaction comprising a transfer of ownership, the system comprising:
    a blockchain stored on a hardware memory;
    a hardware processor, the hardware processor operable to:
       in a pre-approval stage:
          mint an identity block for each approver among a plurality of approvers;
          upload the identity block to the blockchain for each approver among the plurality of approvers;

assign a non-fungible token that uniquely identifies each approver among the plurality of approvers;

in an approval stage:
- receive, from a first entity, a file for approval;
- label the file with a unique file identifier;
- identify a subset of approvers from among the plurality of approvers for approval of the transaction that corresponds to the file;
- mint an approval block for the transaction, the approval block comprising:
  - an entry slot for each non-fungible token associated with each of the subset of approvers among the plurality of approvers; and
  - the unique file identifier;
- initiate an approval process by the subset of approvers among the plurality of approvers;
- receive, from each approver among the plurality of approvers, the non-fungible token that uniquely identifies each approver among the plurality of approvers;
- place each non-fungible token that uniquely identifies each approver among the plurality of approvers in the entry slot;
- upload the approval block to a second blockchain;
- validate the approval; and
- close the approval block, said close the approval block comprises concretization of the transaction by indicating the transfer of ownership of the approval block to a second entity.

14. The system of claim 13 wherein mint the identity block comprises:
- create a new block that corresponds to the identity block on the blockchain;
- validate the new block by a validator of the blockchain; and
- close the new block.

15. The system of claim 14 wherein the validation is a proof of work validation executed by a plurality of users of the blockchain.

16. The system of claim 14 wherein the validation is a proof of stake of validation executed by a plurality of users of the blockchain.

\* \* \* \* \*